United States Patent [19]
Richter

[11] Patent Number: 5,822,609
[45] Date of Patent: Oct. 13, 1998

[54] PROCESSING CIRCUIT FOR PERFORMING A CONVOLUTION COMPUTATION

[75] Inventor: Gerard Richter, Saint Jeannet, France

[73] Assignee: International Business Machines Corporation, Armonk, N.Y.

[21] Appl. No.: 666,767

[22] Filed: Jun. 19, 1996

[30] Foreign Application Priority Data

Jun. 22, 1995 [EP] European Pat. Off. .............. 95480083

[51] Int. Cl.$^6$ .................................................... G06F 15/20
[52] U.S. Cl. ................................ 395/800.35; 364/728.01; 364/736.01
[58] Field of Search .......................... 395/800.01, 800.32, 395/800.35; 364/716.02, 724.12, 724.13, 725.01, 736.01, 736.02, 748.01, 748.16, 754.01

[56] References Cited

U.S. PATENT DOCUMENTS

| | | | |
|---|---|---|---|
| 4,272,828 | 6/1981 | Negi et al. ........................ | 364/736.01 |
| 4,390,961 | 6/1983 | Negi et al. .............................. | 364/756 |
| 5,175,702 | 12/1992 | Beraud et al. ...................... | 364/736.02 |
| 5,285,403 | 2/1994 | Quisquater et al. ................ | 364/736.02 |
| 5,293,611 | 3/1994 | Wada ...................................... | 711/165 |
| 5,311,458 | 5/1994 | Haines et al. ........................ | 364/750.5 |
| 5,422,805 | 6/1995 | McIntyre et al. ....................... | 364/759 |
| 5,566,341 | 10/1996 | Roberson et al. ................. | 395/800.15 |
| 5,598,362 | 1/1997 | Adelman et al. ..................... | 364/750.5 |

FOREIGN PATENT DOCUMENTS

| | | |
|---|---|---|
| 0042452 | 12/1981 | European Pat. Off. . |
| 0425410 | 5/1991 | European Pat. Off. . |
| 9401827 | 1/1994 | WIPO . |
| 9416383 | 7/1994 | WIPO . |

OTHER PUBLICATIONS

IBM Technical Disclosure Bulletin, vol. 33, No. 5, 1 Oct. 1990, pp. 87–89, XP 000107836 "Improved Convolver".

Electro, vol. 12, 1 Jan. 1987, pp. 27/05, 1–09, XP 000119835, Greenberg, H. B.

"The ADSP 2100 Speeds Up DSP Applications with Minimal Design Effort", p. 2, right col., line 20—p. 4, right col., line 22; figures 2–4.

Electronik, vol. 37, No. 19, 16 Sep. 1988, pp. 103–109, XP 000118955, Chaumont, J.M. et al "Drei Operanden in Einen Zyklus Verarbeiten", p. 103, right col., line 7 p. 106, right col., line 9; figs. 1, 3.

IEEE International Solid State Circuits Conference, vol. 34, 1 Feb. 1991, pp. 236–237, 320, XP 000238321, Sjoberg, P.O. "An 8–Channel DSP with Adaptive Balance Filters for Analog Subscriber Lines" figure 1.

IBM Technical Disclosure Bulletin, vol. 31, No. 12, 1 May 1989, pp. 390/391 XP 000120814 Signal Processor Hardware Architecture for Optimum Instruction Efficiency.

IEEE Journal of Solid–State Circuits, vol. 25, No. 6, 1 Dec. 1990, pp. 1526–1536, XP 000176584, Jacobs, G. M. et al "A Fully Asynchronous Digital Signal Processor Using Self–Timed Circuits", p. 1527, left col., line 38 p. 1528, left col., line 25; figure 2.

(List continued on next page.)

*Primary Examiner*—Alpesh M. Shah
*Attorney, Agent, or Firm*—Joscelyn G. Cockburn

[57] ABSTRACT

A processing unit for performing convolution computation according to the HARVARD architecture which includes a first and second input register for receiving a first and second operand, a multiplier for multiplying the operand and a Arithmetic and Logic Unit (ALU) circuit. The unit further includes a coefficient storage memory which is used for loading at least one set of coefficients allowing the convolution computation. The memory storage is addressed either from an internal address generator or directly from the internal data bus thereby allowing the possibility to store either coefficients or data into the memory. The flexibility is still increased by the use of a particular set of multiplexing circuits allowing multiple configurations. An internal address generation circuit is used for performing a partial addressing of the set of coefficients thereby providing decimation capability.

6 Claims, 4 Drawing Sheets

OTHER PUBLICATIONS

EDN Electrical Design News, vol. 38, No. 20, 30 Sep. 1993, pp. 57/58, 65–69, 75/76, 79/80, 87/88, 91, 97/98, 101/102, 105/1, XP 000396393 "DSP–Chip Directory".

Electronic Design, vol. 34, No. 25 Oct. 1986, Hasbrouck Heights, New Jersey, US, pp. 96–103 K. Lamb, "CMOS DSP Building Block Adjust Precision Dynamically", p. 97, left col., line 11—p. 101, right col., line 15, figures 1,2.

$$\sum_{I=1}^{N} DATA\ (K+I).\ COEF\ (I)$$

| CYCLE | DATA MEM. ACCESS | COMPUTE SECTION |
|---|---|---|
| N | READ DATA (K+I) | – ACCUMULATE IN RA |
| N+1 | READ COEF (I) | – MULTIPLY DATA (K+I). COEF (I) |
| N+2 | READ DATA (K+I+1) | – ACCUMULATE IN RA |
| N+3 | READ COEF (I+1) | – MULTIPLY DATA (K+I+1). COEF (I+1) |

| CYCLE | DATA MEM. ACCESS | MODIFIED COMPUTE SECTION |
|---|---|---|
| N | READ DATA (K+I) | – READ COEF (I)<br>– MULTIPLY DATA (K+I). COEF (I)<br>– ACCUMULATE PREVIOUS MULTIPL.<br>– MODIFY COEF MEMORY INDEX |
| N+1 | READ DATA (K+I+1) | – READ COEF (I+1)<br>– MULT. DATA (K+I+1). COEF (I+1)<br>– ACCUMULATE WITH PREV. MULTIPL.<br>– MODIFY COEF MEMORY INDEX |

FIG. 4

PROCESSING CIRCUIT FOR PERFORMING A CONVOLUTION COMPUTATION

TECHNICAL FIELD

The invention relates to the field of digital processing and particularly to processors which are in the computation of convolution and particularly to digital signal processors which are optimized for the computation of convolution.

BACKGROUND ART

Processing circuits which are dedicated to the computation of convolution are known in the art. Such a circuit is disclosed by U.S. Pat. No. 5,163,018 which relates to a digital-signal processing circuit for digital audio equipment which has a coefficient storing portion, a computing portion, a coefficient selection control portion and a coefficient transfer portion. The coefficient storing portion stores multiplier coefficients used for a convolution computation in which a value of each multiplier coefficient can be arbitrarily changed. However, in this circuit, the coefficients are successively provided in a FIFO manner that jeopardize the flexibility of the computation. Particularly, the circuit appears not well fitted for performing autocorrelation computation that requires the possibility to easily change the set of operands which must be multiplied before being accumulated. Additionally, since the circuit is designed for very specific applications, it appears not suitable for providing general purpose convolution processing or still, decimation processes. It is not a general purpose digital signal processor.

SUMMARY OF THE INVENTION

It is an object of this invention to provide a simple and general purpose processing unit based on the Harvard structure which allows effective convolution processing.

It is a further object of the present invention to provide a processing unit based on the Harvard architecture which is fitted with an additional instruction which permits simultaneous fetching of operands or values, performs a multiplication of both, and accumulates the result.

It is another object of the present invention to provide a processing unit which is particularly fitted for performing decimation where only part of the full set of coefficients are used in the computation.

It is a further object of the present invention to provide a processing unit based on the Harvard architecture which provides the possibility to achieve easy autocorrelation computations.

It is an additional object of this invention to provide a convolution computation circuit which is well adapted for the telecommunication field.

These and other objects are provided by means of the processing circuit of the invention as described hereinafter.

Basically, the processing unit complies to the HARVARD architecture and comprises a first and second input register for receiving a first and second operand, a multiplier for multiplying the operand and a Arithmetic and Logic Unit (ALU) circuit. The unit further comprises a coefficient storage memory which is used for loading at least one set of coefficients allowing the convolution computation. The memory storage is addressed either from an internal address generator or directly from the internal data bus thereby allowing the possibility to store either coefficients or data into the memory. The flexibility is still increased by the use of a particular set of multiplexing circuits allowing multiple configuration. An internal address generation circuit is used for performing a partial addressing of the set of coefficients thereby providing decimation capability.

DESCRIPTION OF THE DRAWINGS

FIG. 4 illustrates a comparison between the elementary cycles which are required both in the prior art system and in the invention in order to compute a convolution operation.

DESCRIPTION OF THE PREFERRED EMBODIMENT OF THE INVENTION

Figure 1:
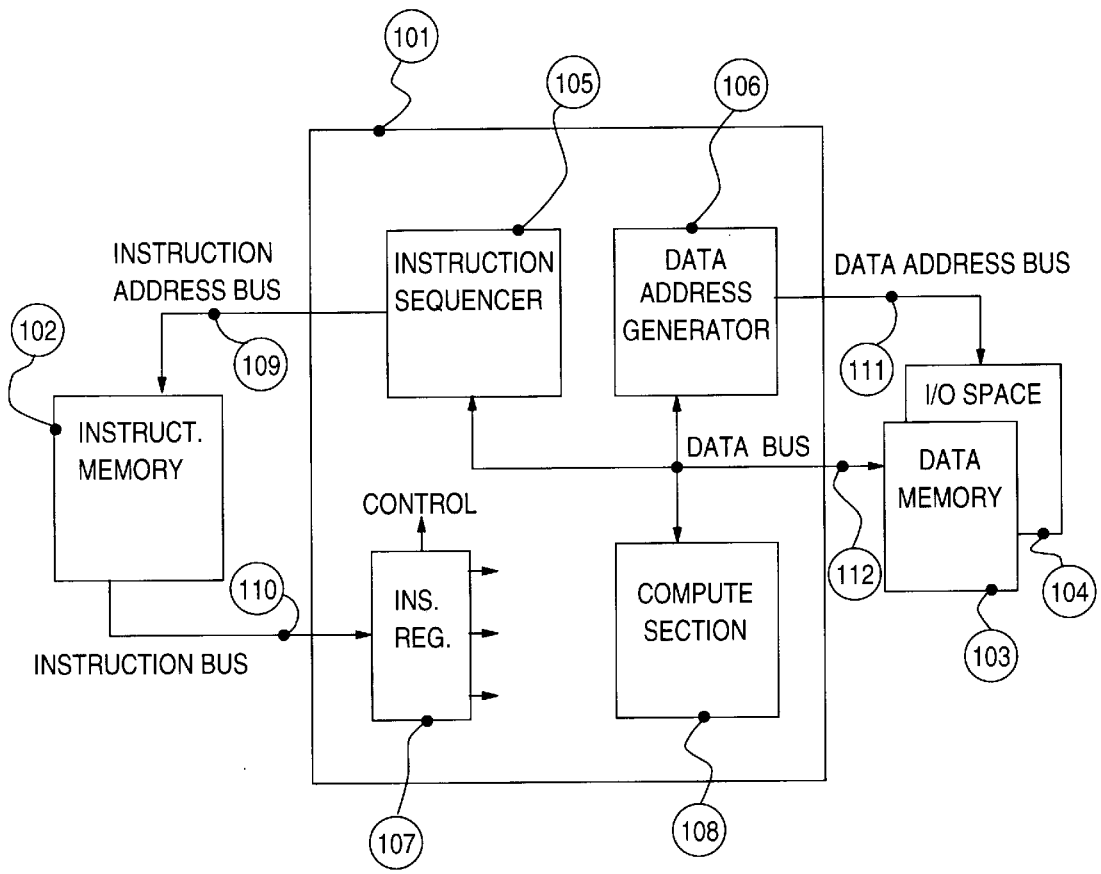
FIG. 1 is an illustration of the general architecture of a Digital Signal processor in which the present invention is embodied.

FIG. 1 is an illustration of the general architecture of a Digital Signal processor where the present invention is embodied. It should be noticed that, in the preferred embodiment of the invention, the architecture complies with the well-known HARVARD type architecture. This type is characterized by a separate set of data and instruction busses.

As shown in FIG. 1, DSP 101 is associated with a program memory 102 which is addressed by means of a Instruction address bus 109 and which provides with the corresponding instructions on an Instruction bus 110. On the other side, DSP 101 uses a data memory 103 through a bus 112 in order to store its internal data. A I/O space 104 can also be addressed by means of a Data Address bus 111.

More particularly, DSP 101 comprises a Instruction sequencer 105 for controlling the code sequence; a data address generator for providing the addresses required for addressing data 103; a compute section designed for the arithmetic and logic operations and one Instruction register 107 which stores the instructions fields received from the Instruction memory 103. Instruction sequencer 105, data address generator 106 and compute section 108 communicate via an internal data bus which is connected to bus 112.

A typical structure of Compute section 108 which complies to HARVARD circuit will now be discussed with reference to FIG. 2. However, it should be noted that any modification of the structure of Compute section 108 can be brought without departing from the spirit of the invention. Basically, the Compute section 108 comprises a multiplier 201 and an Arithmetic and Logic Unit (ALU) 202. Multiplier 201 has two inputs which respectively receives the contents of a register 206 and a register 207 and provides the result of the multiplication to the input of a MULT REG register 205. The latter has its output which is connected to a first input of a first MUX (multiplexor) 208 which second input is connected to receive the contents of register 206. Similarly, register 207 is connected to a first input of a second MUX multiplexing circuit 209. ALU circuit 202 receives the contents of the two MUX circuit 208 and MUX circuit 209. The result of the arithmetic or logic operation performed on these two operands is then loaded either into ACCUL accumulator 203 or ACCU2 accumulator 204 which are also connected to the inputs of MUX multiplexor 209 and multiplexor 210. The latter also receives the contents of register 206 and generates the output data which will be carried on internal data bus 112. Both registers 206 and 207 have their input bus connected to a multiplexor 211 so that either the data in or data out extracted from bi-directional data bus 112 can be loaded into the two registers.

It will now be described how the above architecture can be utilized for performing the traditional convolution operation:

$$\sum_{i=1}^{i=N} \text{data}(k+i) \times \text{Coeff}(i)$$

Such a computation is achieved by performing a successive sequence of instructions which is hereinafter summarized and also represented in the table of FIG. 4:

| Cycle | Data Mem. Access | Compute Section |
| --- | --- | --- |
| n | Read DATA (k+i) | Accumulate in Accu |
| n+1 | Read coeff (i) | Multiply DATA (k+i)xCoeff (i) |
| n+2 | Read DATA (k+i+1) | Accumulator in Accu |
| n+3 | Read Coeff (i+1) | Multiply DATA (k+i+1)xCoeff (i+1) |

As shown in the table above, the convolution is achieved by a set of two successive elementary cycles. A first cycle allows the fetching of the data which is stored into register 206. A second cycle is used for fetching the coefficient which is loaded into register 207. During the second cycle, the two operands are provided to the inputs of multiplier 201 and the result is stored into MULT_REG 205. In the next cycle, MUX 208 and 209 are set so as to permit the addition of the contents of ACCUL register 203 and the contents of MULT_REG register 205. Therefore, it appears that a convolution operation of N taps will require a set of 2×N cycles.

Figure 2:
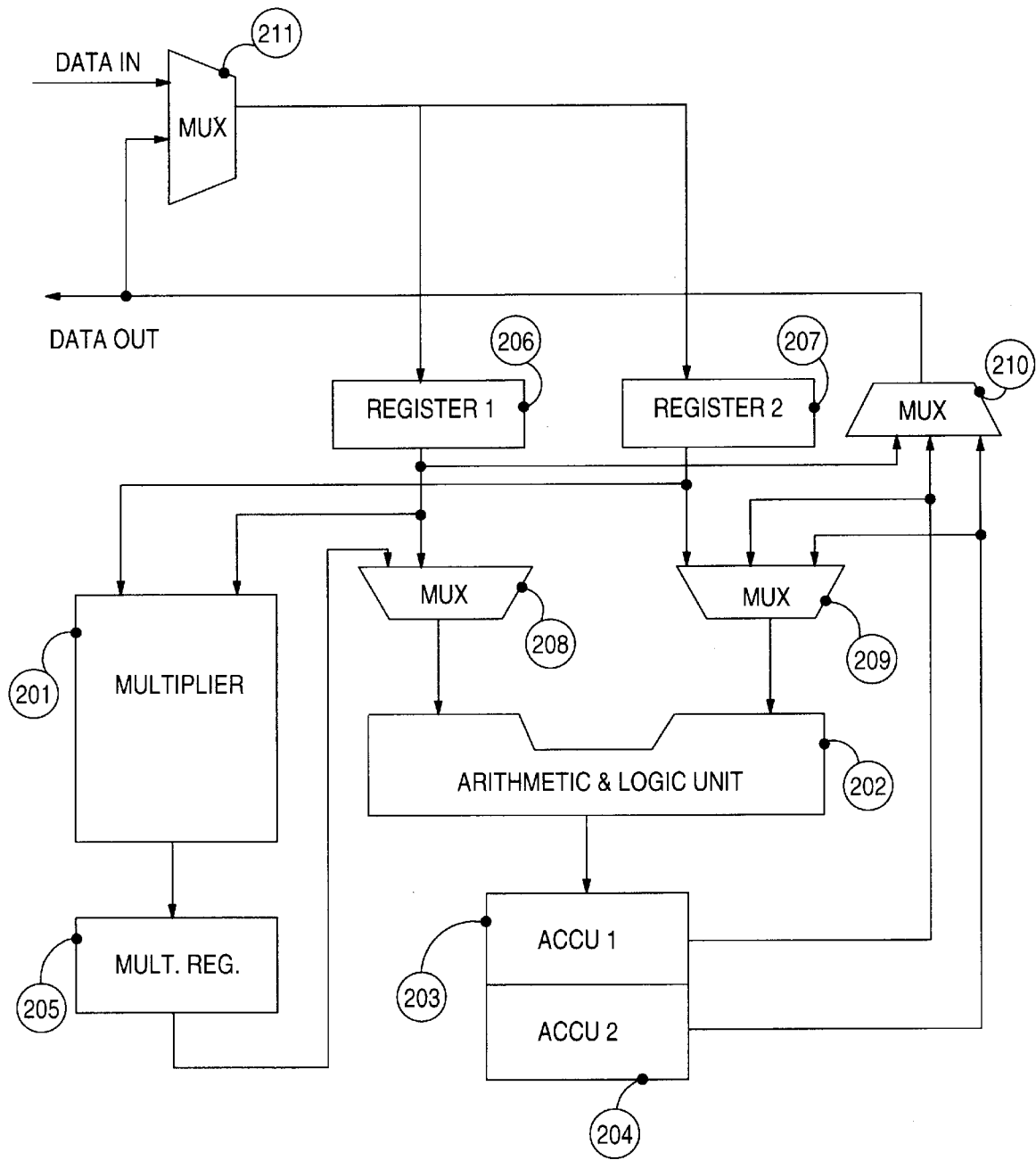
FIG. 2 illustrates a typical structure of the computing section in accordance with the Harvard circuit.
Figure 3:
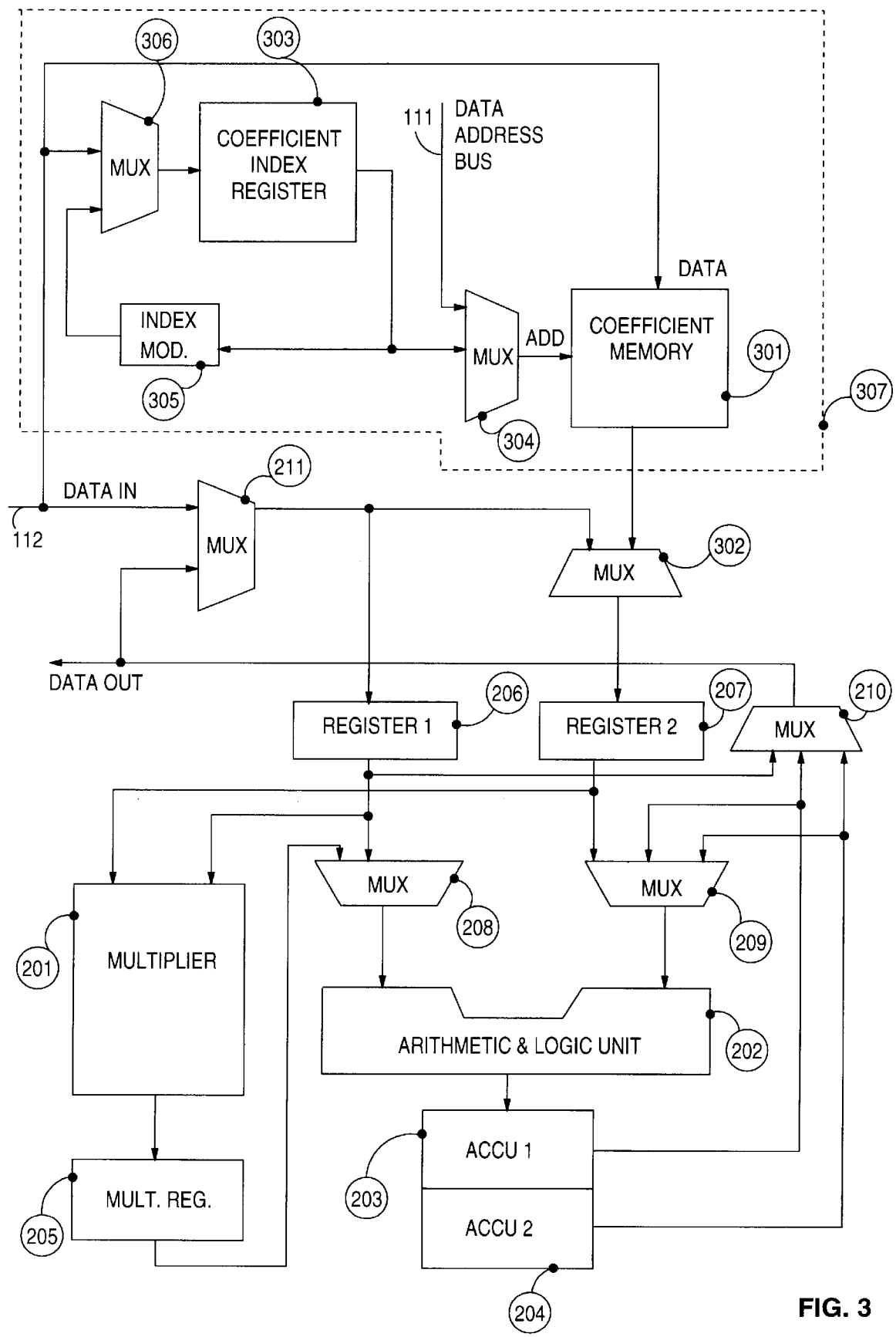
FIG. 3 represents the structure of the computing section when modified in accordance with the present invention.

FIG. 3 shows how the structure of FIG. 2 is modified in order to embody the present invention and achieve the same convolution in a set of N elementary cycles. In this new structure, register 207 is connected to an additional MUX multiplexor 302 so that the contents of the latter register can be either provided by MUX circuit 211 as previously described, or from the contents of a specific circuit 307 which is designed for automatically providing an operand to be stored into register 207. Circuit 307 comprises a memory 301 which stores a multiplicity of coefficients. Memory 301 receives an address which is provided by a multiplexor 304 which allows the selection of either an address stored into a Coefficient index register 303 or the address carried onto data address bus 111 of FIG. 1. The output of Coefficient Index Register 303 is also connected to the input of an index modifier circuit 305 which output is connected to a first input of a multiplexor 306. Multiplexor 306 also receives on its second input the data coming from the internal data bus 112 of FIG. 1 and has an output which can be transferred into Coefficient Index Register 303.

The operation of the circuit 307 will now be described in detail. A first initialization phase is initiated. The phase consists of the loading of the different coefficients which are required for the appropriate algorithm which will be performed. It should be noticed that each considered algorithm (for instance for filtering application) will have its corresponding set of coefficients which are loaded into data memory 103. The initialization period which is above mentioned allows memory 301 to be loaded with a particular set of coefficients and therefore permits the circuit 307 to be adapted for a particular algorithm which is required. Also, in accordance with the capacity of memory 301, it should be noticed that numerous sets of coefficients can even be directly loaded into the memory so that an unique initialization period is required even for different algorithm. To achieve this initial loading, multiplexor 304 is set so as to permit the set of addresses which are provided on bus 111 to be transferred to the address bus of coefficient memory 301. Also, the desired coefficients Coeff(i) are successively presented on data bus 112. Memory 301 is then loaded with all the required coefficients Coeff(i) from i=1 to N. At last, the Coefficient Index Register 303 is loaded with the address of the location that contains the first coefficient of the desired set of coefficient, that is Coeff(1) in our example. It should be noticed that, in the case where the Coefficient Memory 301 is loaded with numerous sets of coefficients corresponding to different algorithms (e.g. two distinctive filtering algorithms), the Coefficient Index Register 303 is loaded with the value of the address that corresponds to the first coefficient of the particular algorithm that is desired. The initial loading of the Coefficient Index Register 303 is performed by means of multiplex MUX circuit 306 that allows the transferring and loading of the appropriate value from data bus 112 into register 303. MUX circuit 306 is then positioned so as to connect the output of Index Modifier circuit 305 to Coefficient Index Register 303. Also, MUX circuit 304 is positioned so as to permit the Coefficient Index Register 303 to address the Coefficient Memory 301.

Once the initialization period is completed, the convolution computation can be achieved as follows, and summarized in the table below which is also represented in the table of FIG. 4:

| Cycle | Data Mem. Access | Compute Section |
| --- | --- | --- |
| n | Read DATA (k+i) | Read Coeff (i) |
| | | Multiply Data (k+i)xCoeff (i) |
| | | Accumulate previous multiplication |
| | | Update Coeff Memory Index |
| n+1 | Read DATA (k+i+1) | Read Coeff (i+1) |
| | | Multiply Data (k+i+1)xCoeff (i+1) |
| | | Accumulate previous multiplication |
| | | Update Coeff Memory Index |

For each clock transition, register 206 is loaded with the value of Data(k+i). This is achieved by positioning the MUX circuit 211 so as to permit the transfer of the contents of data bus 112 to the input bus of Register 206, and by activating the Load control input of the latter register. Simultaneously, Register 207 is loaded with the value of the current coefficient which is addressed by the value loaded into Coefficient Index Register 303. This is achieved by positioning the MUX circuit 302 so that to permit the transfer of the output of Memory 301 into Register 207, and by activating the load control input of the latter register. Since the value of the data and the corresponding coefficient are presented at the two inputs of the multiplier 201. Therefore, the output of Multiplier 201 provides the expression Data(k+i)xCoeff(i) to the input of MULT_REG register 205 which, however, was loaded with the result of the preceding multiplication Data (k+i−1)xCoeff(i−1) at the considered clock transition. Therefore, the result of the previous multiplication is accumulated into the appropriate Accumulator circuit, e.g. accu 203. As shown in FIG. 3, this is achieved because MUX 208 and 209 are so positioned as to permit the output of MULT_REG register 205 and ACCU circuit 203 to be respectively connected to the first and second input of ALU circuit 202. At last, the same clock transition is used for the update of the contents of Coefficient Index Register 303 by means of Index modifier 305. This update can take the form of a simple incrementation or decrementation in accordance with the organization of the coefficients inside memory 301. It should be noticed that if the incrementation factor is set to a value which is different from one, the circuit appears capable to perform a decimation processing which is, for instance, useful in the telecommunication area.

We can also implement the modulo function which is important in filtering.

As a consequence, it appears that, for each clock transition, two operands are simultaneously loaded into register 206 (data) and 207 (for the coefficient) and multiplied by multiplier 201; the result of the previous multiplication is loaded into MULT_REG circuit 205 and accumulated into ACCU1 circuit 203; and, at last, the coefficient Index Register is updated so that the next address of the coefficient is prepared.

Therefore, the convolution process can be performed by a succession of N elementary cycles with the enhanced circuit of the invention, while 2×N cycles were previously need.

Also, because of the existence of the combination of both Coefficient Index Register 303 and Index Modifier 305, the coefficient Memory is capable of storing numerous set of coefficients, and therefore permits numerous distinctive algorithms to be efficiently performed. Additionally, since the contents of memory 301 can be easily changed a great flexibility is allowed and the system can be even used for performing autocorrelation computations.

We claim:

1. A processing circuit for performing a convolution operation which comprises:

a first and a second register (206, 207) for respectively receiving a first and a second operand;

a multiplier (201) having two inputs which are respectively connected to the outputs of said first and second register (206, 207) and an output which is connected to a third register (MULT.REG, 205);

a first multiplexing circuit (208) which has a first input connected to the output of said third register (MULT.REG, 205) and a second input connected to said first register (206);

a second multiplexing circuit (209) which has a first input connected to the output of said second register (207), a second and a third input;

an Arithmetic and Logic Unit (ALU) circuit (202) receiving at its first input the contents of said first multiplexing circuit (208) and at its second input the contents of said second multiplexing circuit (209), said ALU circuit providing a result which is loaded into a first and second accumulator (203, 204) which outputs are respectively connected to the second and the third input of said second multiplexor circuit;

a third multiplexing circuit (210) which has a first input receiving the contents of said first register (206), a second input and a third input which respectively receives the contents of said first and second accumulator (203, 204), the output of said third multiplexing circuit providing the data to be outputted to a data out bus;

a fourth multiplexing circuit (211) which receives at a first input the data coming from said internal data bus and which has a second input which is connected to the output of said third multiplexing circuit (210);

characterized in that it further comprises:

a fifth multiplexing circuit (302) receiving at its first input the output of said fourth multiplexing circuit (211);

a coefficient storage memory (301) for storing at least one set of data or coefficients, said memory having a data bus connected to a second input bus of said fifth multiplexing circuit (302);

a fourth register (COEFFICIENT INDEX REGISTER, 303) for storing the address to be used for addressing said coefficient storage memory (301);

a sixth multiplexing circuit (304) receiving at a first input the contents of said fourth register (303) and at a second input the contents of said internal data bus, said sixth multiplexing circuit (304) having its output connected to the address bus of said storage memory (301);

an index modifier circuit (305) connected to receive the contents of said fourth register (303) and for computing the new address to be used for addressing said storage memory (301);

a seventh multiplexing circuit (306) having a first input which receives the data coming from said internal data bus and a second input which receives the address computed by said index modifier circuit (305), said seventh multiplexing circuit having an output which is connected to the input of said fourth register (COEFFICIENT INDEX REGISTER, 303).

2. Processing circuit according to claim 1 characterized in that said index modifier circuit 305 further comprises means for incrementing the addresses used for addressing said storage memory (301) by a value that is different from one whereby said processing unit achieves a decimation process using the coefficients stored into said memory.

3. Processing circuit according to claims 1 or 2 characterized in that said processing circuit further comprises means for storing numerous sets of coefficients allowing multiple filtering computations.

4. Processing circuit according to claims 1 or 2 whereby said first register (206) stores a first operand and characterized in that it comprises means for storing a second operand into said coefficient storage memory (301) in order to perform an autocorrelation process.

5. Processing circuit according to claim 1 characterized in that said processing circuit further includes:

means active during each clock transition for positioning said fourth multiplexing circuit (211) in order to transfer the contents Data(k+i) of said internal data bus into said first register (206);

means for positioning said fifth multiplexing circuit (302) in order to transfer the coefficient Coeff(i−1) extracted from said coefficient storage memory into said second register (207);

means for positioning said first and second multiplexing circuit (208, 209) in order to permit the output of said third register (MULT.REG, 205) and one of said accumulator (203, 204) to be respectively transmitted to the first and second input of said ALU circuit (202), whereby the result of Data(k+i)×Coeff(i−1) provided by said multiplier (201) is being accumulated.

6. A circuit arrangement for enhancing the computational capabilities of a processing unit, having a first and a second input register for receiving a first and second operands, a multiplier for multiplying the operands and an Arithmetic and Logic Unit (ALU) arrangement, comprising:

a first multiplexing circuit (302);

a coefficient storage memory (301) for storing at least one set of data or coefficients, said memory having a data bus connected to an input of said first multiplexing circuit (302);

a register (COEFFICIENT INDEX REGISTER, 303) for storing an address to be used for addressing said coefficient storage memory (301);

a second multiplexing circuit (304) receiving at a first input the contents of said register (303) and at a second input the contents of an internal data bus, said multiplexing circuit (304) having its output connected to the address bus of said storage memory (301);

an index modifier circuit (305) connected to receive the contents of said register (303) and for computing the new address to be used for addressing said storage memory (301); and a third multiplexing circuit (306) having a first input which receives the data coming from said internal data bus and a second input which receives the address computed by said index modifier circuit (305), said third multiplexing circuit having an output which is connected to the input of said register (COEFFICIENT INDEX REGISTER, 303).

* * * * *